US006961094B2

(12) United States Patent
Kagawa

(10) Patent No.: US 6,961,094 B2
(45) Date of Patent: Nov. 1, 2005

(54) IMAGE-SIGNAL PROCESSING APPARATUS AND METHOD

(75) Inventor: Takashi Kagawa, Saitama (JP)

(73) Assignee: Sony Corporation, Tokyo (JP)

( * ) Notice: Subject to any disclaimer, the term of this patent is extended or adjusted under 35 U.S.C. 154(b) by 634 days.

(21) Appl. No.: 09/931,661

(22) Filed: Aug. 16, 2001

(65) Prior Publication Data

US 2002/0025071 A1 Feb. 28, 2002

(30) Foreign Application Priority Data

Aug. 18, 2000 (JP) .......................... P2000-248718

(51) Int. Cl.[7] .............................................. H04N 7/01
(52) U.S. Cl. ..................................... 348/441; 348/448
(58) Field of Search ........................ 348/441, 445–459

(56) References Cited

U.S. PATENT DOCUMENTS

| | | | | |
|---|---|---|---|---|
| 4,672,445 A | * | 6/1987 | Casey et al. ................. 348/450 |
| 4,739,390 A | * | 4/1988 | Achiha et al. ............... 348/449 |
| 4,853,765 A | | 8/1989 | Katsumata et al. |
| 4,937,667 A | * | 6/1990 | Choquet et al. ............. 348/448 |
| 5,034,816 A | | 7/1991 | Morita et al. |
| 5,051,826 A | * | 9/1991 | Ishii et al. .................... 348/448 |
| 5,333,054 A | * | 7/1994 | Tanaka et al. ............... 348/666 |
| 5,355,178 A | | 10/1994 | Parulski |
| 5,452,021 A | * | 9/1995 | Kusaka et al. ............... 348/699 |
| 5,534,935 A | * | 7/1996 | Kawai et al. ................ 348/448 |
| 5,583,575 A | * | 12/1996 | Arita et al. .................. 348/451 |
| 5,886,745 A | * | 3/1999 | Muraji et al. ................ 348/448 |
| 5,943,099 A | * | 8/1999 | Kim ............................. 348/448 |
| 6,040,873 A | | 3/2000 | Izumi et al. |
| 6,144,412 A | * | 11/2000 | Hirano et al. ................ 348/441 |
| 6,509,930 B1 | * | 1/2003 | Hirano et al. ................ 348/452 |
| 6,611,286 B1 | * | 8/2003 | Terasawa et al. ........ 348/220.1 |
| 6,876,395 B1 | * | 4/2005 | Muto et al. .................. 348/441 |

FOREIGN PATENT DOCUMENTS

| | | |
|---|---|---|
| EP | 0 944 269 | 9/1999 |
| JP | 10 136358 | 5/1998 |

OTHER PUBLICATIONS

Patti A. et al: "Robust Methods for High-Quality Stills from Interlaced Video in the Presence of Dominant Motion" IEEE Transactions on Circuits and Systems for Video Technology, vol. 7, No. 2, Apr. 30, 1997, pp. 328-342, XP000687651 New York.

* cited by examiner

*Primary Examiner*—Paulos M. Natnael
(74) *Attorney, Agent, or Firm*—Frommer Lawrence & Haug LLP; William S. Frommer; Thomas F. Presson

(57) ABSTRACT

An image signal output from a first delay circuit is taken out from an image interpolation filter and from a second delay circuit corresponding to an image-quality adjustment filter, and an image signal selected by a first selector is output through a second selector from an output terminal. In this case, a bypass unit (the second delay circuit and the first selector) for bypassing the image interpolation filter and the image-quality adjustment filter to take out a first set and a second set of images written into first and second image memories is provided. Selections at the first and second selectors are made according to an identification signal for identifying an interlaced image signal or a progressive image signal, extracted by a decoder circuit, a still-image/motion-image mode signal input to a first control terminal, and a first/second field selection signal input to a second control terminal.

6 Claims, 2 Drawing Sheets

IMAGE-SIGNAL PROCESSING APPARATUS AND METHOD

BACKGROUND OF THE INVENTION

1. Field of the Invention

The present invention relates to image-signal processing apparatuses suited to digital video equipment, and more particularly, to an image-signal processing apparatus and method which always form the best still-image signal from a video signal generated by either a so-called interlacing image method or a so-called progressive image method.

2. Description of the Related Art

In conventional video units, video signals of the interlacing image method are used for capturing and recording, which include first and second fields of an image in which, generally, adjacent fields have different time axes. Since video signals generated by the interlacing image method during capturing and recording have different time axes in alternate fields, motion images having smooth movement are obtained. Therefore, capturing and recording are usually performed by the interlacing image method in digital video units.

There is a demand for such video units which can generate a still-image signal from a recorded motion-image video signal and display it. However, when a one-frame still image is generated from a video signal formed, for example, by the above-described interlacing image method, since first and second fields have different time axes, a flicker is generated when there is a portion which has movement between the fields and image quality deteriorates. To eliminate this problem, such a portion having movement is detected, and the image shown at the portion is modified to remove the flicker.

Specifically, in FIG. 2, in a conventional apparatus, a digital-image data stream formed, for example, by the interlacing image method, is input to an input terminal 1. The data stream input via the input terminal 1 is sent to a decoder circuit 2 which converts data streams to video signals to generate digital image signals including first and second fields which conform, for example, to the standard TV signal system and in which respective images are formed of alternate horizontal scanning lines in frames. The decoder circuit 2 outputs a digital video signal including these digital image signals.

The image signal in each field is sent from the decoder circuit 2 to a field memory 3, and an image signal taken out from the field memory 3 is sent to a field memory 4. The field memories 3 and 4 receive writing control signals applied to terminals 5 and 6, and reading control signals applied to terminals 7 and 8. These signals control writing signals into and reading signals from the field memories 3 and 4. The digital image signals in fields of the digital video signal output from the decoder circuit 2 are sequentially written into the field memories 3 and 4.

Images read from the field memories 3 and 4 are sent to a motion detection filter 9, and portions having movement which are likely to cause flickering between fields are detected. A detection signal is sent to an image interpolation filter 10. In addition, the images read from the field memories 3 and 4 are sent to the interpolation filter 10 through delay circuits 11 and 12 which correspond to the detecting filter 9. With these operation, the interpolation filter 10 modifies the image shown at the portion having the detected movement and read from the field memory 3 by using the image read from the field memory 4 so as to eliminate flickering.

With such modification, the sharpness of the portion where modification has been applied is reduced, and the difference in image quality between the portion and other portions where modification has not been applied becomes conspicuous. Therefore, filter processing for reducing sharpness to the same extent as that for the portion where modification has been applied is performed for the portions where modification has not been applied to make the entire image quality uniform. Specifically, the image interpolation filter 10 performs filter processing for the entire signal so as to make the entire image quality uniform. A filter 13 also applies the same processing to an image signal output from the delay circuit 11.

A selector 14 selects alternately, in fields, an image signal sent from the image interpolation filter 10 and an image signal sent from the filter 13 to output from an output terminal 15 a still-image signal including a first field, and a second field to which modification has been applied so as not to generate a flicker. A motion-image signal sent from the delay circuit 11 is taken out from a delay circuit 16 corresponding to the image interpolation filter 10 and the filter 13, and the motion-image signal is selected by a selector 17 and is output from the output terminal 15 through the selector 14.

Selections at the above-described selectors 14 and 17 are made according to a still-image/motion-image mode signal input via a control terminal 18, and a first/second field selection signal input to a control terminal 19. When the mode signal indicates a motion image, namely, is "1," this mode signal "1" is inverted by an inverter circuit 20 and the inverted signal "0" is input to the selector 17 to select the delay-circuit-16 side (B). In addition, the mode signal "1" is input to the selector 14 through an OR circuit 21 to select the selector-17 side (A), so that a motion-image signal is output from the output terminal 15.

When the mode signal indicates a still image, namely, is "0," this mode signal "0" is inverted by the inverter circuit 20 and the inverted signal "1" is input to the selector 17 to select the filter-13 side (A). In addition, the first/second field selection signal is input through the OR circuit 21 to the selector 14 to alternately select, in fields, the image signal (B) sent from the image interpolation filter 10 and the image signal (A) sent from the filter 13 and selected by the selector 17, so that a still-image signal having first and second fields is output from the output terminal 15.

Therefore, according to the above-described apparatus, when the mode signal indicates a motion image, a video signal generated by the interlacing image method is taken out as a motion-image signal. When the mode signal indicates a still image, a still-image signal having a first field, and a second field to which modification has been applied so as not to cause flickering, is taken out. With these operations, from a video signal generated by the interlacing image method, when the mode signal indicates a motion image, the original motion-image signal is obtained as is, and when the mode signal indicates a still image, an acceptable still-image signal having no flicker is obtained.

In some camcorder apparatuses, which include a digital video cassette recorder (VCR), for example, capturing and recording are performed by the interlacing image method, in which a video signal has first and second fields of an image having different time axes in alternate fields, and in addition, as required, capturing and recording are also performed by the progressive image method, in which a video signal has first and second fields obtained by extracting every other horizontal scanning line from images having different time axes in alternate frames.

Since capturing and recording are performed by both the interlacing image method and the progressive image method as described above, a video signal generated by the interlacing image method during capturing or recording has different time axes in alternate fields, and therefore, a motion image having a smooth movement is obtained; and a video signal generated by the progressive image method during capturing or recording has the same time axis in one frame, and therefore, a high-resolution image is obtained. When a still image is formed by this method, a higher-quality still image signal is obtained.

When a motion image and a still image are switched in such a way by the use of the apparatus shown in FIG. 2, even if a video signal generated by the progressive image method is input, a signal is obtained through the image interpolation filter 10. When a video signal generated by the progressive image method is input, since a detection is not made by the detecting filter 9, interpolation processing is not performed. But, filter processing, which makes the entire image quality uniform, is applied to the entire signal. The same processing is also applied to an image signal sent from the delay circuit 11 by the filter 13.

Since video signals generated by the progressive image method during capturing and recording have the same time axis in one frame, flickering does not occur. Therefore, it is neither necessary to modify an image to eliminate flickering nor to perform filter processing to reduce sharpness. Consequently, it is relatively easy to generate still images having a high sharpness with just the use of one frame memory.

In conventional digital video units which can perform capturing and recording by the progressive image method and by the interlacing image method, since circuits for these methods are shared, the same processing is applied to video signals of the progressive image method and those of the interlacing image method. Therefore, even when a video signal of the progressive image method is input, the same filter processing as that performed when a video signal of the interlacing image method is input is applied, and the obtained image has the same image quality as a conventional still image generated from a video signal of the interlacing image method.

To prevent sharpness from being reduced, it can be considered that the precision of motion detection is improved. For example, motion is detected in units of pixels to prevent sharpness from being reduced in images generated by both the progressive image method and the interlacing image method. To implement this idea, however, the size of circuits such as a memory and gate elements used for motion detection needs to be increased. It is very difficult to provide such circuits, for example, for camcorder apparatuses, for example, which are required to be compact and light-weight.

SUMMARY OF THE INVENTION

The present invention has been made in consideration of the above points. In conventional apparatuses, since the same processing as that applied to video signals of the interlacing image method is applied to those of the progressive image method, even when a still image is generated from a video signal of the progressive image method, filter processing is performed thereby reducing sharpness, and a still image maintaining a high sharpness of a video signal of the progressive image method cannot be obtained. Accordingly, it is an object of the present invention to provide an image-signal processing apparatus and an image-signal processing method which always allow the best still-image signal to be generated from a video signal generated by either a so-called interlacing image method or a so-called progressive image method.

The foregoing object is achieved in one aspect of the present invention through the provision of an image-signal processing apparatus for generating a still-image signal in any one frame from a video signal including either an interlaced image signal having first and second fields of an image in which adjacent fields have different time axes or a progressive image signal having first and second fields obtained by alternately extracting every other horizontal scanning line from images having different time axes in alternate frames, including identification means for identifying the interlaced image signal or the progressive image signal included in the video signal; first and second image memories for storing two consecutive fields of images included in the video signal; a motion detection filter for detecting motion by comparing the images stored in the first and second image memories; an image interpolation filter for, when motion is detected by the motion detection filter in a first set of images stored in the first and second image memories, modifying the first set of images with a second set of images stored in the first and second image memories; an image-quality adjustment filter for applying image-quality adjustment corresponding to the image interpolation filter to the second set of images stored in the first and second image memories; bypass means for bypassing the image interpolation filter and the image-quality adjustment filter to extract the first set and the second set of images stored in the first and second image memories; and signal output means for alternately extracting, in fields, the first set and the second set of images sent from the image interpolation filter and from the image-quality adjustment filter when the identification means identifies the interlaced image signal or cannot identify the interlaced image signal, and for alternately extracting, in fields, the first set and the second set of images sent from the bypass means when the identification means identifies the progressive image signal.

A path through which a video signal is processed by the image interpolation filter and the image-quality adjustment filter and output, and a bypass through which a signal is obtained without passing through the filters are provided. In addition, a path through which a signal is obtained is selected according to whether the video signal is an interlaced image signal or a progressive image signal. Therefore, an acceptable, flicker-free, still-image signal is extracted from a video signal of the interlacing image method, and a still image which maintains a high sharpness is generated from a progressive image signal.

The image-signal processing apparatus may further include a reproduction apparatus for reproducing the video signal from any recording medium and for generating a reproduction output signal which form the still-image signal.

Since a reproduction apparatus for reproducing the video signal from any recording medium and for generating a reproduction output signal from the still-image signal is included, the present invention can also be applied to a camcorder which includes a digital-type video cassette recorder.

The image-signal processing apparatus may further include a display apparatus for receiving the video signal through wire or without wire and for displaying the still-image signal.

Since a display apparatus for receiving the video signal through wire or without wire and for displaying the still-image signal is included, the present invention can also be applied to a video cassette recorder having a digital input.

The foregoing object is achieved in another aspect of the present invention through the provision of an image-signal processing method for generating a still-image signal in any one frame from a video signal including either an interlaced image signal having first and second fields of an image in which adjacent fields have different time axes or a progressive image signal having first and second fields obtained by alternately extracting every other horizontal scanning line from images having different time axes in alternate frames, including an identification step of identifying the interlaced image signal or the progressive image signal included in the video signal; a step of storing two consecutive fields of images included in the video signal in first and second image memories; a motion detecting step of detecting motion by comparing the images stored in the first and second image memories; a step of, when motion is detected in the motion detecting step in first set of images stored in the first and second image memories, modifying the first set of images with a second set of images stored in the first and second image memories by an image interpolation filter; a step of applying image-quality adjustment to the second set of images stored in the first and second image memories by using an image-quality-adjustment filter corresponding to the image interpolation filter; a bypass step of bypassing the image interpolation filter and the image-quality adjustment filter to extract the first set and the second set of images stored in the first and second image memories; and a signal output step of alternately extracting, in fields, the first set and the second set of images sent from the image interpolation filter and from the image-quality adjustment filter when the interlaced image signal is identified or cannot be identified in the identification step, and of alternately extracting, in fields, the first set and the second set of images extracted in the bypass step when the progressive image signal is identified in the identification step.

The image-signal processing method may further include a step of reproducing the video signal from any recording medium and of generating a reproduction output signal which form the still-image signal.

The image-signal processing method may further include a step of receiving the video signal through wire or without wire and of displaying the still-image signal.

As described above, the present invention easily eliminates the following problem found in conventional apparatuses. In conventional apparatuses, since processing applied to video signals of the interlaced image method is also applied to video signals of the progressive image method, even when a video signal of the progressive image method is used to form a still image, filter processing for reducing sharpness is performed. Therefore, a still image which maintains a high sharpness cannot be generated from a video signal of the progressive image method.

DESCRIPTION OF THE PREFERRED EMBODIMENT

Figure 1:
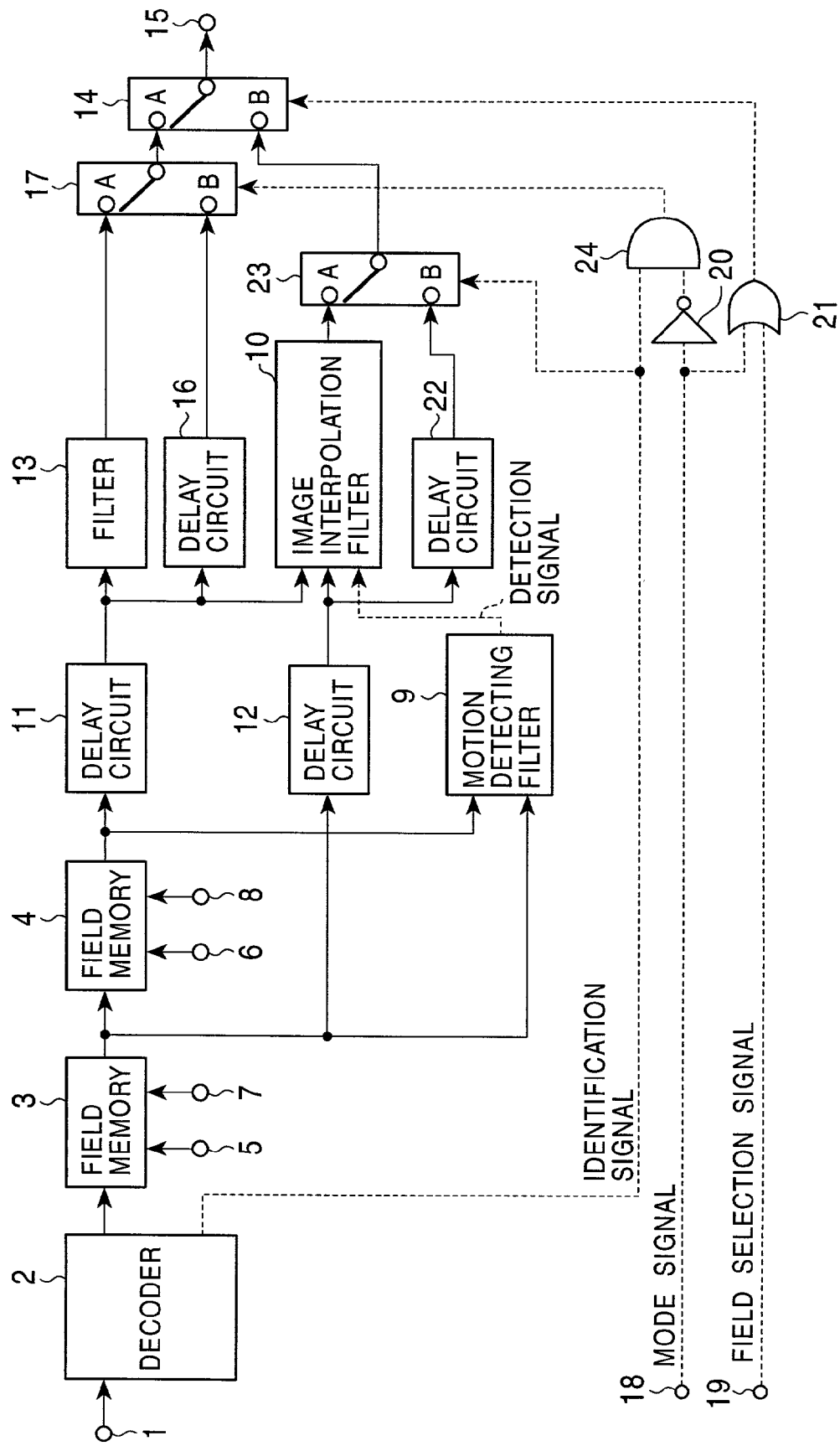
FIG. 1 is a block diagram of an image-signal processing apparatus according to an embodiment of the present invention.

An embodiment of the present invention will be described below by referring to the drawings.

Figure 2:
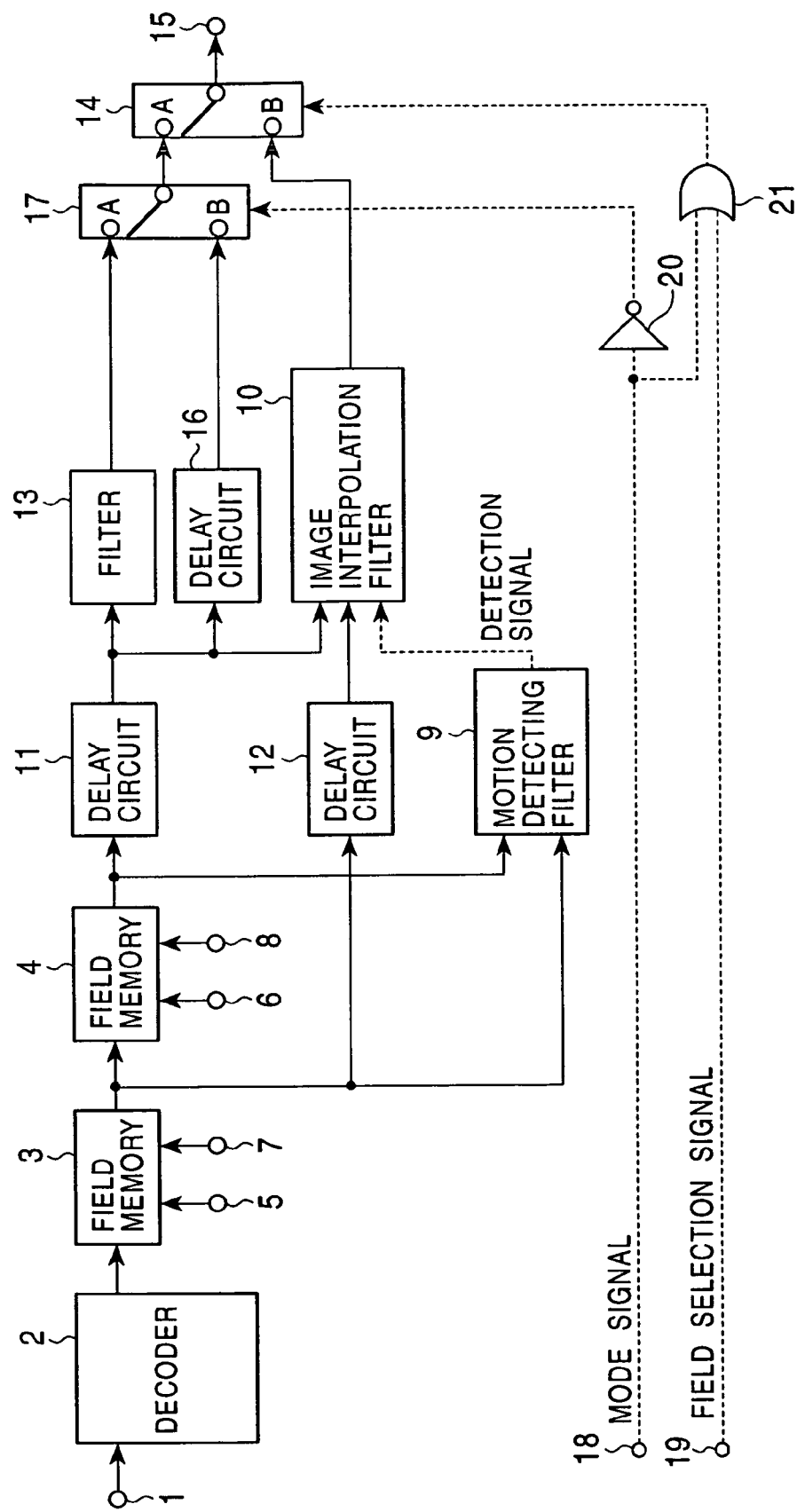
FIG. 2 is a block diagram of a conventional image-signal processing apparatus.

FIG. 1 is a block diagram of an image-signal processing apparatus according to an embodiment of the present invention. The same symbols used in FIG. 2 are assigned to the portions corresponding to those shown in FIG. 2, and descriptions thereof will be omitted.

In FIG. 1, a digital-image data stream having first and second fields of an image in which, for example, adjacent fields have different time axes, by the interlacing image method; or a digital-image data stream having first and second fields generated by alternately taking out every other horizontal scanning line from images having different time axes in one frame by the progressive image method is input to an input terminal 1. The data stream input from the input terminal 1 is sent to a decoder circuit 2 which converts data streams to video signals.

The decoder circuit 2 converts the data stream into digital image signals including first and second fields which conform, for example, to the standard TV signal system and in which images are formed of alternating horizontal scanning lines in frames. The decoder circuit 2 outputs a digital video signal including these digital image signals. The decoder circuit 2 also extracts an identification signal for identifying an interlaced image signal or a progressive image signal, from a user's bit in the data stream.

The image signal in each field is sent from the decoder circuit 2 to a first field memory 3, and an image signal taken out from the field memory 3 is sent to a second field memory 4. The field memories 3 and 4 receive writing control signals applied to terminals 5 and 6, and reading control signals applied to terminals 7 and 8. These signals control writing signals into and reading signals from the field memories 3 and 4. The digital image signals in fields of the digital video signal output from the decoder circuit 2 are sequentially written into the field memories 3 and 4.

Images read from the field memories 3 and 4 are sent to a motion detection filter 9, and portions having movement which are likely to cause flickering between fields are detected. A detection signal is sent to an image interpolation filter 10. In addition, the images read from the field memories 3 and 4 are sent to the interpolation filter 10 through delay circuits 11 and 12 which correspond to the detecting filter 9. With these operation, the interpolation filter 10 modifies the image shown at the portion having the detected movement and read from the field memory 3 by using the image read from the field memory 4 so as to eliminate a flicker.

With such modification, the sharpness of the portion where modification has been applied is reduced, and a difference in image quality between the portion and other portions where modification has not been applied becomes conspicuous. Therefore, filter processing for reducing sharpness to the same extent as that for the portion where modification has been applied is performed for the portions where modification has not been applied to make the entire image quality uniform. Specifically, the image interpolation filter 10 performs filter processing to the entire signal so as to make the entire image quality uniform. An image-quality adjustment filter 13 also applies the same processing to an image signal output from the delay circuit 11.

A selector 14 alternately selects, in fields, an image signal sent from the image interpolation filter 10 and an image signal sent from the filter 13 to output from an output terminal 15 a still-image signal having a first field, and a second field to which modification has been applied so as not to generate flickering. A motion-image signal sent from the delay circuit 11 is taken out from a delay circuit 16 corresponding to the image interpolation filter 10 and the filter 13, and the image signal is selected by a selector 17 and is output from the output terminal 15 through the selector 14.

To generate a still-image signal from a progressive image signal, the progressive image signal output from the delay circuit 12 is taken out from a delay circuit 22 corresponding to the image interpolation filter 10 and the filter 13, and the image signal is selected by a selector 23 and is output through the selector 14 from the output terminal 15. In this case, bypass means (the delay circuit 22 and the selector 23) for bypassing the image interpolation filter 10 and the image-quality adjustment filter 13 to take out a first set and a second set of images written into the first and second image memories 3 and 4, respectively, is provided.

Selections at the above-described selectors 14, 17, and 23 are made according to the identification signal for identifying an interlaced image signal or a progressive image signal, extracted by the decoder circuit 2, a still-image/motion-image mode signal input to a control terminal 18, and a first/second field selection signal input to a control terminal 19. When the decoder circuit 2 outputs an identification signal of "1," which indicates an interlaced image signal, this identification signal "1" selects the image-interpolation-filter-10 side (A) at the selector 23, and turns on an AND circuit 24.

When the mode signal indicates a still image, namely, is "0," this mode signal "0" is inverted by the inverter circuit 20 and the inverted signal "1" is input to the selector 17 to select the filter-13 side (A). In addition, the first/second field selection signal is input through the OR circuit 21 to the selector 14 to alternately select, in fields, the image signal (B) sent from the image interpolation filter 10 and the image signal (A) sent from the filter 13 and selected by the selector 17, so that a still-image signal having first and second fields is output from the output terminal 15.

When an identification signal of "0," which indicates a progressive image signal, is extracted by the decoder circuit 2, this identification signal "0" selects the delay-circuit-22 side (B) at the selector 23. In addition, this signal turns off the AND circuit 24, so that the delay-circuit-16 side (B) is selected at the selector 17. A first/second field selection signal is input to the selector 14 through the OR circuit 21 to alternately select, in fields, an image signal (A) output from the delay circuit 16 and an image signal (B) output from the delay circuit 22.

With these operations, a still-image signal having first and second fields, stored in the field memories 3 and 4, is output from the output terminal 15. In this case, the field memories 3 and 4 store first/second-field image signals of the progressive image method. These image signals are output by the selections at the selectors 17 and 23 without passing through the image interpolation filter 10 or the filter 13 to generate a still image which maintains a high sharpness, from the video signal of the progressive image method.

When the mode signal indicates a motion image, namely, is "1," this mode signal "1" is inverted by the inverter circuit 20 and the inverted signal "0" is input to the selector 17 to select the delay-circuit-16 side (B) irrespective of whether an identification signal indicates that the signal is an interlaced image signal or a progressive image signal. In addition, the mode signal "1" is input through the OR circuit 21 to the selector 14 to select the selector-17 side (A), so that a motion-image signal sent from the field memory 4 is output from the output terminal 15 without passing through the image interpolation filter 10 or the filter 13.

According to the above-described apparatus, when the decoder circuit 2 decodes an interlaced image signal, and a mode signal indicating a still image is output, an image signal in which the image of a portion where motion has been detected and which is output from the image interpolation filter 10, the image being sent from the field memory 3, is modified with an image sent from the field memory 4 so that flickering does not occur, and an image signal to which filter processing has been applied so as to make the entire image quality uniform, the image being output from the filter 13, are alternately selected in fields, so that a still-image signal having first and second fields is output from the output terminal 15.

When the decoder circuit 2 decodes a progressive image signal and a mode signal indicating a still image is output, first/second field image signals generated by the progressive image method and stored in the field memories 3 and 4 are alternately selected in fields to be output from the output terminal 15. With this operation, a high-resolution still-image signal having first and second fields having the same time axis in a one-frame image of the progressive image method is output from the output terminal 15 without passing through the image interpolation filter 10 or the filter 13.

As described above, an acceptable, flicker-free, still-image signal is obtained from a video signal of the interlacing image method, and a still image which maintains a high sharpness is generated from a progressive image signal. When a mode signal indicating a motion image is input, a motion-image signal is sent from the field memory 4 to the output terminal 15 through the delay circuits 11 and 16 and the selectors 17 and 14 without passing through the image interpolation filter 10 or the filter 13 irrespective of whether the identification signal indicates that the signal is an interlaced image signal or a progressive image signal.

In the above-described apparatus, when the decoder circuit 2 cannot distinguish between an interlaced image signal and a progressive image signal, the decoder circuit 2 outputs, for example, an identification signal of "0" to output a signal obtained when an interlaced image signal is assumed to be an input signal, from the output terminal 15. Therefore, also in such a case, a still-image signal having at least the same image quality as an interlaced image signal is generated. In addition, a motion-image signal is always successfully output.

Therefore, in the present embodiment, a path through which a video signal is processed by the image interpolation filter and the image-quality adjustment filter and output, and a bypass through which a signal is obtained without passing through the filters are provided. In addition, the path through which a signal is obtained is selected according to whether the video signal is an interlaced image signal or a progressive image signal. Therefore, an acceptable, flicker-free, still-image signal is extracted from a video signal of the interlacing image method, and a still image which maintains a high sharpness is generated from a progressive image signal.

In conventional apparatuses, since processing applied to video signals of the interlaced image method is also applied to video signals of the progressive image method, even when a video signal of the progressive image method is used to form a still image, filter processing for reducing sharpness is performed. Therefore, a still image which maintains a high sharpness cannot be generated from a video signal of the progressive image method. The present invention easily eliminates this problem.

In the above embodiment, a data stream input to the input terminal 1 can be a data stream reproduced from a recording medium. Then, the above embodiment can be applied to a camcorder having a digital-type video cassette recorder. Alternatively, a data stream input to the input terminal 1 can be a data stream which has been transmitted by wire or wirelessly. Thus, the above embodiment can be applied to a video cassette recorder having a digital input.

The present invention is not limited to the above-described embodiment. Various modifications are possible within the scope of the present invention.

What is claimed is:

1. An image-signal processing apparatus for generating a still-image signal in any one frame from a video signal including either an interlaced image signal having first and second fields of an image in which adjacent fields have different time axes or a progressive image signal having first and second fields obtained by alternately extracting every other horizontal scanning line from images having different time axes in alternate frames, said apparatus comprising:

identification means for identifying the interlaced image signal or the progressive image signal included in the video signal;

first and second image memories for storing two consecutive fields of images included in the video signal;

a motion detection filter for detecting motion by comparing the images stored in the first and second image memories;

an image interpolation filter for, when motion is detected by the motion detection filter in a first set of images stored in the first and second image memories, modifying the first set of images with a second set of images stored in the first and second image memories;

bypass means for bypassing the image interpolation filter to extract the first set and the second set of images stored in the first and second image memories; and signal output means for alternately extracting, in fields, the first set and the second set of images sent from the image interpolation filter when the identification means either identifies the interlaced image signal or cannot identify the interlaced image signal, and for alternately extracting, in fields, the first set and the second set of images sent from the bypass means when the identification means identifies the progressive image signal.

2. The image-signal processing apparatus according to claim 1, further comprising a reproduction apparatus for reproducing the video signal from any recording medium and for generating a reproduction output signal which form the still-image signal.

3. The image-signal processing apparatus according to claim 1, further comprising a display apparatus for receiving the video signal through wire or without wire and for displaying the still-image signal.

4. An image-signal processing method for generating a still-image signal in any one frame from a video signal including either an interlaced image signal having first and second fields of an image in which adjacent fields have different time axes or a progressive image signal having first and second fields obtained by alternately extracting every other horizontal scanning line from images having different time axes in alternate frames, said method comprising:

an identification step of identifying the interlaced image signal or the progressive image signal included in the video signal;

a step of storing two consecutive fields of images included in the video signal in first and second image memories;

a motion detecting step of detecting motion by comparing the images stored in the first and second image memories;

a step of, when motion is detected in the motion detecting step in a first set of images stored in the first and second image memories, modifying the first set of images with a second set of images stored in the first and second image memories by using an image interpolation filter;

a bypass step of bypassing the image interpolation filter to extract the first set and the second set of images stored in the first and second image memories; and a signal output step of alternately extracting, in fields, the first set and the second set of images sent from the image interpolation filter when the interlaced image signal is identified or cannot be identified in the identification step, and of alternately extracting, in fields, the first set and the second set of images extracted in the bypass step when the progressive image signal is identified in the identification step.

5. The image-signal processing method according to claim 4, further comprising a step of reproducing the video signal from any recording medium and of generating a reproduction output signal which form the still-image signal.

6. The image-signal processing method according to claim 4, further comprising a step of receiving the video signal through wire or without wire and of displaying the still-image signal.

* * * * *